March 12, 1935.   D. C. ESPLEY   1,993,924
DEVICE FOR CONTROLLING THE POWER FACTOR OF A CIRCUIT
Filed March 17, 1933
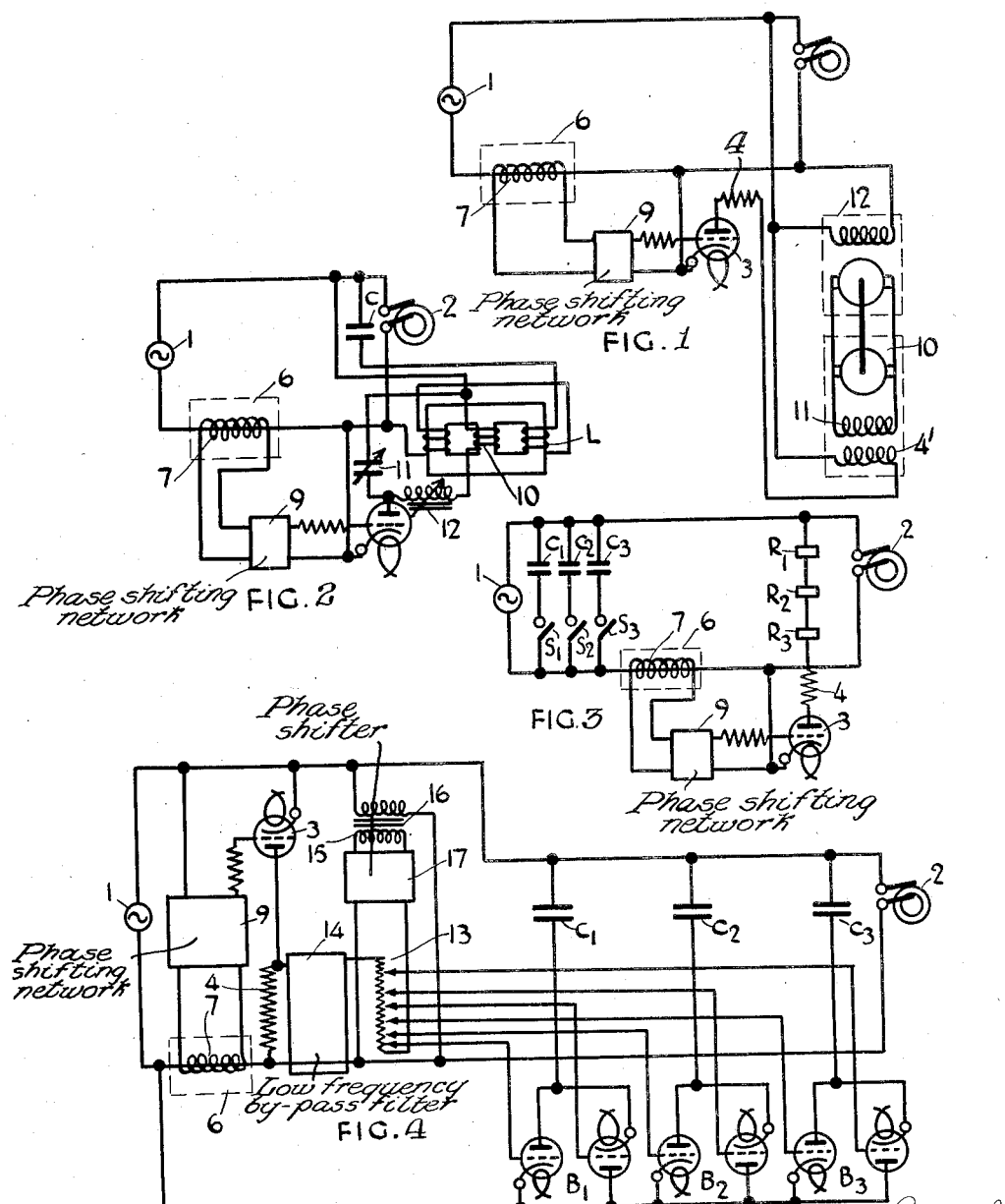
Inventor, Dennis C. Espley   By Attorney, M. H. Lockwood Patented Mar. 12, 1935

1,993,924

UNITED STATES PATENT OFFICE 1,993,924

DEVICE FOR CONTROLLING THE POWER FACTOR OF A CIRCUIT

Dennis Clark Espley, Hendon, England, assignor to The General Electric Company Limited, London, England Application March 17, 1933, Serial No. 661,345
In Great Britain March 18, 1932

4 Claims. (Cl. 172—246)

This invention relates to electrical circuits for the control of power factor.

It is known that if the grid and anode of a gas-filled triode are supplied with alternating potentials of the same frequency, the mean anode current depends on the relation between their phases. Further, if the amplitude of the grid potential greatly exceeds the critical grid potential, the mean anode current is almost independent of that amplitude and depends only on the amplitude of the anode potential and on the phase difference between the grid and anode potentials. The critical grid potential, is the steady potential that would have to be applied between grid and cathode in order just to prevent the discharge passing when the anode potential is a maximum in its cycle. If the amplitude of the grid potential is large compared with this, the discharge will start only when the grid potential is very near its mean value, and the phase at which it becomes just less than the critical potential varies very little with the amplitude. This fact is the basis of the invention.

According to the invention, a circuit for the control of power factor comprises a gas-filled triode; the anode of the triode is supplied with a potential in phase with the potential of the circuit in which the power factor is to be controlled; the grid of the triode is supplied with a potential in phase with the current in that circuit, the amplitude of this grid potential being much greater than the critical grid potential of the triode. Alternatively, the anode may be supplied with potential in phase with the current in the circuit, and the grid with potential in phase with the potential in the circuit. In these statements the words "in phase with $x$" are to be interpreted to mean "differing in phase from $x$ by a constant angle $\phi_0$ independent of the power factor". The value of $\phi_0$ may be controlled by a phase-shifting network of known type inserted in the connection of the anode and/or the grid with its source of supply; it must be chosen with reference to the special application of the invention.

Five applications of the invention will now be described with reference to the accompanying drawing; Figure 1 illustrates an application in which power factor is controlled by means of a synchronous motor; Figure 2 one in which power factor is controlled by means of static condensers and associated reactors; Figure 3 one in which power factor is controlled by switching static condensers in parallel with the load; Figure 4 one which is a modification of Figure 3. Referring now to Figure 1, 2 is the load supplied from the supply 1 and 3 is the gas-filled triode which is supposed to have an indirectly heated cathode. The cathode of the triode is connected to one of the mains, and the anode through a resistance 4 and field coils $4^1$ of a D. C. generator 10 to the other main. The load circuit includes a primary of a current transformer 6 the secondary 7 of which is connected between the grid and cathode of the triode 3; a phase shifting network 9 may be inserted between the secondary 7 and the grid circuit. When the power factor of the load 2 varies, the phase difference between the anode and grid circuits of the triode will be changed; this change will in general alter the mean anode current flowing in the coil 4. During each positive half cycle of anode potential, anode current only commences to flow when the grid potential exceeds the critical value and the mean anode current is changed by varying this point in the cycle at which anode current commences to flow. If, however, the grid potential had already exceeded the critical value before the commencement of the positive half cycle of anode potential, then anode current would always commence to flow at the beginning of each positive half cycle of anode potential and changes in the phase difference between the anode and grid potentials would not cause any change in the mean anode current. The phase difference introduced by the network 9 is therefore chosen so that changes of power factor which may occur in the load 2 do actually always produce changes in the mean anode current.

Fig. 1 shows how a gas-filled triode may be used, not merely to measure the power-factor of the circuit, but to control it by means of a synchronous motor. It is well known that the power factor of a circuit can be controlled by placing the stator of a synchronous motor in parallel across the supply and varying the exciting current supplied to the rotor. The exciting current is usually supplied from a D. C. generator mechanically coupled to the synchronous motor, and is varied by changing the field current of this generator through the insertion of resistances or like means. The field coils $4^1$, excited by the gas-filled triode, are separate from and additional to the shunt coils 11 with which the generator is normally provided. Any change of the power factor of the circuit due to a change in the load will then produce a change in the excitation of the D. C.

generator, and thus a change in the excitation of the synchronous motor 12. 12 is connected in parallel with the load 2, a change in its excitation will therefore produce a change in the power factor of the circuit. It is clear that this last change can be made of such a sign as to oppose the original change of power factor, and therefore to decrease the change of power factor produced by the change in the load. Since the object of controlling power factor is usually to keep it near to unity, the network 9 and the coils $4^1$ will usually be adjusted so that, when the load is normal, the power factor is unity; but this is not essential and the apparatus can be adjusted so as to oppose any deviations of the power factor from a value other than unity.

The magnitude of the compensating change introduced by the change in the excitation of 12 should, of course, be adjusted so that the compensation is as nearly complete as possible. The manner in which this adjustment may be made, will be clear to those skilled in the art, but it should be observed that, if the circuit is arranged as in Figure 1, the compensation can never be absolutely complete, just as the regulation of a steam engine by a centrifugal governor can never be complete. For as the condition of complete compensation is approached, the compensating means necessarily cease to be effective. That is unavoidable so long as the transformer 6, which applies the grid voltage to the controlling triode, is placed between the supply 1 and the compensating means 12. But if 6 is placed between the compensating means 12 and the load 2, the position is different; for now the introduction of compensation does not affect the condition of the controlling triode, which is always determined by the condition of the load and not by the condition of the supply. The amount of compensation introduced will now be determined entirely by the power factor of the load, and not at all by the magnitude of the load. This amount can be chosen so that the compensation is complete when the load has one particular value; but the compensation will then be incomplete when the load has other values. This drawback can be removed by making the amount of compensation introduced depend on the magnitude of the load as well as on its power factor. If cos $\phi$ is the power factor of the load and $I_L$ the current in it the amount of wattless current that must be added to the load in order to make the power factor of the combination unity is $I_L \sin \phi$. If cos $\phi$ is not very different from unity, the mean anode current in the triode can be made proportional to sin $\phi$; the problem is then to introduce an amount of wattless current proportional to the product of two currents. Methods of effecting this will occur at once to those skilled in the art; for instance advantage may be taken of the fact that the torque in a dynamometer is proportional to the product of the currents through its coils. But the necessary elaboration of the compensating means is not likely often to be justified. In general one of the two simple methods will be adopted in which the compensation depends on the power factor only. The circumstances of the problem will determine which of these two methods of compensation is preferable and therefore in which of the two positions the transformer 6 is to be placed.

Figure 2 shows how a gas-filled triode may be used to control power factor automatically, but now through the medium of static condensers and associated reactors. It is known that the capacity of the condenser necessary to control power factor can be greatly reduced by placing an inductance in series with it. If the circuit consisting of a condenser and inductance in series is tuned to a frequency slightly higher than that of supply its reactance at the supply frequency will be negative and thus resemble the reactance of a condenser of much larger capacity than that actually placed in the circuit. If the inductance is slightly reduced, the effective capacity of the condenser will be reduced also and its effect on the power factor of the circuit will be changed. Now the anode current from the gas-filled triode can be used to vary the inductance in several known ways. If the inductance is iron-cored, the current may be used either to saturate the core partially or to alter the relative position of core and coils. Figure 2 illustrates the first of these methods. Symbols 1, 2, 3, 6, 7, 9 denote the same parts as before. The condenser C and inductance L, connected across the load are tuned, as explained, to a frequency slightly higher than that of the supply. 10 is an inductance coil in the anode circuit of the triode linked with the iron core of L. 11 is a condenser and 12 an inductance not linked with the core of L. 11 and 12 are so adjusted in a known manner that most of the A. C. component of the anode current passes through 11, while the D. C. component passes through 10. A change in the power factor of the circuit changes the current passing through 10 and thus changes the saturation of the iron core of L. The consequent change in the effective capacity produces a further change in the power factor of the circuit; and as before, the sign of this further change can be made opposite to that of the original change. As to the magnitude of the change, the considerations previously set forth are applicable here also. There are again two methods of compensation according to the position of the transformer 6.

Figure 3 shows yet another example of control, according to this invention, the compensation being now in steps and not continuous. In this example, the second of the two methods of compensation mentioned above is preferable to the first and accordingly the transformer 6 has been placed between the compensating means, ($C_1$, $C_2$, $C_3$) and the load 2. The numerals 1, 2, 3, 4, 6, 7, 9 indicate the same parts as before, but in series with the resistance 4 and forming part of it are placed the relays $R_1$, $R_2$, $R_3$. (Of course the number of these relays is arbitrary and may be greater or less than three). These relays are adjusted to operate at different currents, so that, as the power factor tends towards a lagging angle and the current through 4 and the relays decreases, first $R_1$, then $R_2$, then $R_3$ operate successively. Each of these relays on operation closes the corresponding switch $S_1$, $S_2$, or $S_3$ and thus introduces the compensating condenser $C_1$, $C_2$, or $C_3$, which reduces the angle of lag.

The reason for preferring, with this method of compensation, to place S between the load and the compensating means is that the compensation is essentially discontinuous and that the first method of compensation, in which 6 is between the compensating means and the supply is likely to cause hunting. But this method is not completely excluded. Thus if the number of condensers is large enough, the discontinuity in the compensation can be made practically negligible.

Figure 4 shows an arrangement similar in principle to that of Figure 3, in which the relays for switching in the condensers are replaced by gas-filled triodes performing the same function. The switching triodes are denoted in the figure by the letter B, and are thus distinguished from the controlling triode denoted by the numeral 3. Symbols 1, 2, 3, 4, 5, 6, 7, 9, denote the same parts as before. A potential drop, dependent on the power factor, is produced across the resistance 4 and produces a D. C. potential across resistance 13 via a low frequency by-pass filter 14, which is designed to pass a D. C. component but to attenuate a component with a frequency as high as that of the supply. The gas-filled triodes $B_1$ $B_2$ and $B_3$ are biassed in pairs from the D. C. potential across resistance 13 in such a way that each of the pair can pass substantially half cycles of current according to the direction of its connection across the line. The steady negative bias is graded in steps from pair to pair and an A. C. component is superimposed, on this steady bias, from winding 15 of the voltage transformer 16 via phase shifter 17; the phase shift introduced by 17 is adjusted so that, if current flows in $C_1$, $C_2$, $C_3$, it starts to flow at the correct phase. In the diagram pair $B_2$ has a larger negative bias than pair $B_1$, and pair $B_3$ a larger negative bias than pair $B_2$. When the power factor of the main supply tends toward a lagging angle then the potential across resistance 4, and hence across resistance 13, falls to such a value, that, with suitable adjustment of the circuit, the positive grid potential peak on one of the pair $B_1$ allows current to flow through condenser $C_1$ for half a cycle. Reversal of the voltage during the second half cycle allows the other of the pair to discharge condenser $C_1$. Further decrease of the lagging angle of the power factor still further reduces the steady bias on the three pairs of triodes until the second pair $B_2$ will operate in a manner above described and introduce $C_2$. Pair $B_3$ will come into operation at a still further change of the power factor and introduce $C_3$. It is to be observed that, though the condensers C are drawn for convenience on the right hand-side of 6, they are switched in on the left-hand side of 6; 6 is therefore, as in Figure 3, between the compensating means and the load.

I claim:—

1. A device for controlling the power factor of a circuit comprising a gas filled electric discharge tube having a cathode, an anode and a control grid, means for applying a potential between the cathode and one of the two remaining electrodes, the phase displacement, if any, between the applied potential and that of the circuit being constant, means for applying a potential between the cathode and the remaining electrode, the phase displacement, if any, between the second applied potential and the current in said circuit being constant, compensating means for changing the power factor of the circuit and means responsive to changes in the output of the gas discharge tube due to a change of the load in the circuit and arranged to operate the compensating means to cause a change in the power factor of the circuit opposite in sign to that due to said change of load.

2. A device for controlling the power factor of a circuit as claimed in claim 1, wherein the compensating means comprises a synchronous motor.

3. A device for controlling the power factor of a circuit as claimed in claim 1, wherein the compensating means comprises a condenser in series with an inductance.

4. A device for controlling the power factor of a circuit as claimed in claim 1, wherein the compensating means comprises a plurality of condensers and means for connecting the condensers in parallel with the load as required.

DENNIS CLARK ESPLEY.